(12) United States Patent
Li et al.

(10) Patent No.: US 7,320,005 B2
(45) Date of Patent: Jan. 15, 2008

(54) SYSTEM AND METHOD FOR MANAGING NATIVE APPLICATION DATA

(75) Inventors: Zaitao Li, Houston, TX (US); Xiaoyong Yu, Houston, TX (US)

(73) Assignee: Computer Associates Think, Inc., Islandia, NY (US)

( * ) Notice: Subject to any disclaimer, the term of this patent is extended or adjusted under 35 U.S.C. 154(b) by 420 days.

(21) Appl. No.: 10/420,021

(22) Filed: Apr. 21, 2003

(65) Prior Publication Data

US 2004/0010521 A1    Jan. 15, 2004

Related U.S. Application Data

(60) Provisional application No. 60/373,779, filed on Apr. 19, 2002.

(51) Int. Cl.
*G06F 7/00* (2006.01)

(52) U.S. Cl. .......................................... 707/102; 707/1

(58) Field of Classification Search .............. 707/1–10, 707/100, 200, 203, 101, 102, 104
See application file for complete search history.

(56) References Cited

U.S. PATENT DOCUMENTS 5,708,828 A    1/1998    Coleman .................... 395/785
6,360,249 B1*    3/2002    Courts et al. ............... 709/203
2002/0165727 A1*    11/2002    Greene et al. ................. 705/1
2003/0028451 A1*    2/2003    Ananian ...................... 705/27
2005/0154699 A1*    7/2005    Lipkin et al. ................... 707/1
2005/0240621 A1    10/2005    Robertson et al. .......... 707/102
2005/0273726 A1*    12/2005    Wyzga et al. ............... 715/780

\* cited by examiner

*Primary Examiner*—Wilson Lee
(74) *Attorney, Agent, or Firm*—Baker Botts L.L.P.

(57) ABSTRACT

Methods and systems are disclosed for migrating data between a legacy application data repository and an enterprise database. One exemplary system includes a legacy application data repository, an enterprise database, an export module for exporting data from the repository in an enterprise application compatible format, and a check-in module for updating the enterprise database to reflect the exported data. The exemplary system further includes a check-out module for extracting data from the enterprise database and converting the extracted data to an enterprise application compatible format, and an import module for updating the repository to reflect the checked-out data.

22 Claims, 6 Drawing Sheets

SYSTEM AND METHOD FOR MANAGING NATIVE APPLICATION DATA

CROSS-REFERENCE TO RELATED APPLICATIONS

This application claims priority to U.S. Provisional Application entitled "Data Interface Between a Native Desktop Format and an Enterprise Database Server", Ser. No. 60/373,779, filed Apr. 19, 2002, which is hereby incorporated by reference in its entirety.

TECHNICAL FIELD

The described systems and methods are generally related to enterprise information processing environments. More specifically, the described systems and methods are related to managing data of a legacy desktop application in an enterprise information processing environment.

BACKGROUND

Enterprises often employ large, complex, computing environments that include a number of enterprise components such as servers, rooters, databases, repositories, mainframes, personal computers, business applications and enterprise management software, for example. Such enterprises may include legacy desktop applications which were designed to operate in a limited environment, such as on a single personal computer, for example. Data managed by a legacy desktop application may be useful to support other business processes or applications within an enterprise, but the data may be unavailable to such other processes or applications due to the closed or proprietary architecture of the legacy desktop application.

Typically, data from a legacy desktop application is stored in a native format which may not be easily accessible by an enterprise application. In instances where the data from a desktop legacy application is not accessible by other applications and/or processes within the enterprise, a database server on a network may be utilized to make the data accessible to such other applications and/or processes. However, when transforming such legacy desktop applications into enterprise-compatible applications often, a majority of the data layer and/or a majority of the application may need to be rewritten. In extreme instances, the application may have to be redesigned from scratch. Such changes can involve a significant development effort, and may be undesirable due to backward compatibilities associated with the new requirements of on line operation of desktop applications.

The prior art systems and methods for managing native application data are not sufficient to enable businesses efficiently to make use of legacy desktop application data. Specifically, there is not presently a method or system that enables enterprise access to native legacy desktop application data without affecting the data layer and/or native format of the data. Further, current solutions to the problems of making native application data available to other applications and/or processes within an enterprise are time consuming, require significant redevelopment of the legacy application, and/or cannot be reused and threaten the backward compatibility of the legacy application.

SUMMARY

The following presents a simplified summary of methods and systems associated with managing native application data in an enterprise processing environment. This summary is not an extensive overview and is not intended to identify key or critical elements of the methods and/or systems or to delineate the scope of the methods and systems media. It conceptually identifies the methods and systems in a simplified form as a prelude to the more detailed description that is presented later.

In accordance with one aspect of the present application, an exemplary method is disclosed for migrating data from a legacy application data repository to an enterprise database. The method includes extracting a first set of data in a native format from a legacy application data repository. The method also includes processing the first set of data to generate a second set of data in an enterprise application compatible format. The second set of data is transmitted to a database server, and an enterprise database is updated based on the second set of data.

In accordance with another aspect of the present application, a second exemplary method is disclosed for migrating data from an enterprise database to a legacy application data repository. The second method includes extracting a first set of data from an enterprise database, and processing the first set of data to generate a second set of data in an enterprise application compatible format. The second method further includes transmitting the second set of data to a remote computer, and updating a legacy application data repository based on the second set of data.

In accordance with yet another aspect of the present application, an exemplary system is disclosed for migrating data between a legacy application data repository and an enterprise database. The system includes a legacy application data repository containing data in a native format, and an enterprise database. The system also includes an export module operative to extract a first set of data from the repository in the native format, process the first set of data to generate a second set of data in an enterprise application compatible format, and output the second set of data. The system further includes a check-in module operative to update the enterprise database based on the second set of data.

In addition, the system includes a check-out module operative to extract a first set of checked-out data from the enterprise database, process the first set of checked-out data to generate a second set of checked-out data in an enterprise application compatible format, and output the second set of checked-out data. An import module is also included in the system. The import module is operative to update the legacy application data repository based on the second set of checked-out data.

Certain illustrative aspects of the methods and systems are described herein in connection with the following description and the annexed drawings. These aspects are indicative, however, of but a few of the various ways in which the principles of the methods, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
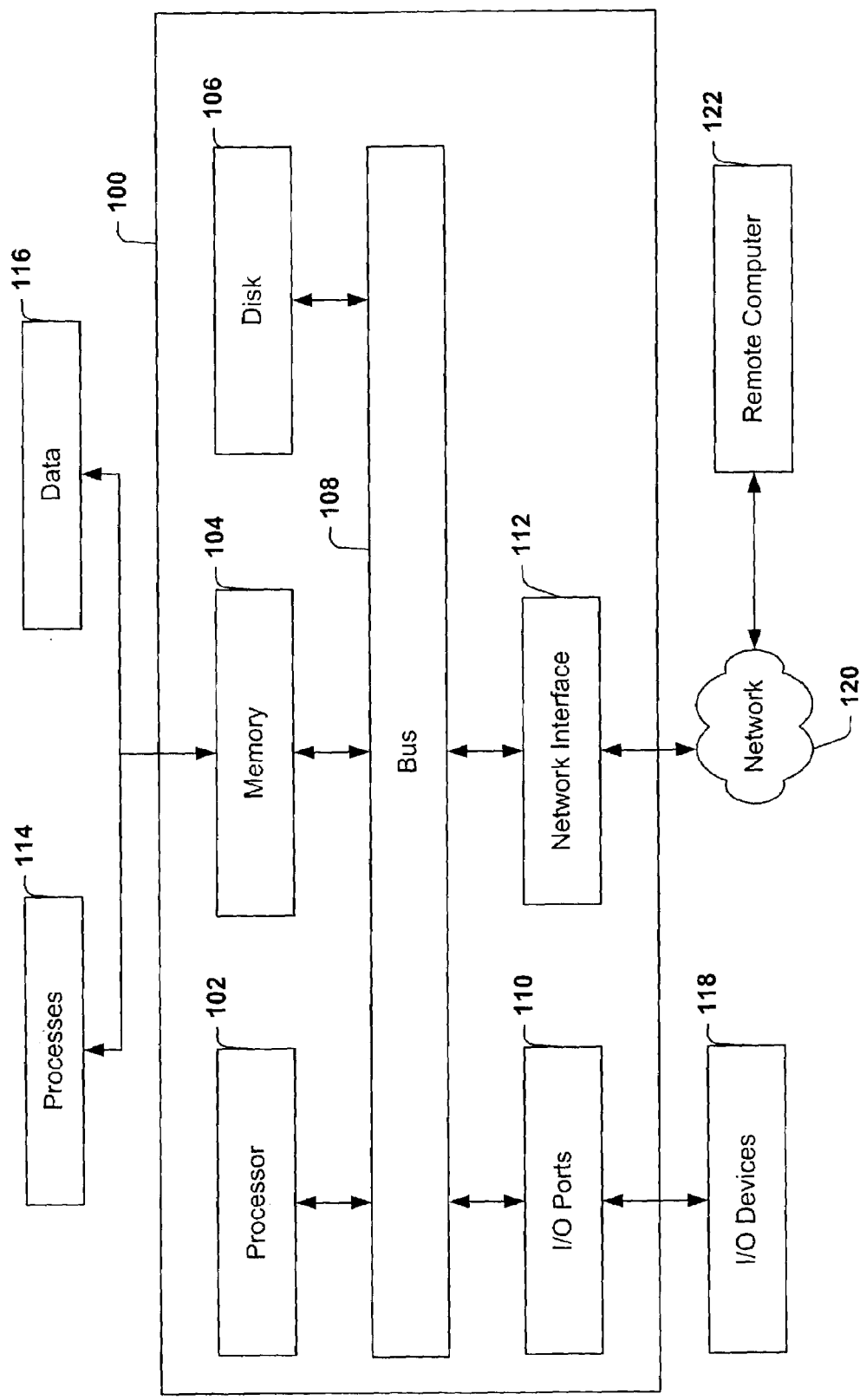
FIG. 1 is a block diagram illustrating an example personal computing environment with which example described systems and methods can interact.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

FIG. 1 illustrates an example computer 100 that includes a processor 102, a memory 104, a disk 106, input/output ports 110, and a network interface 112 operably connected by a bus 108. Executable components of the systems described herein may be located on a computer like computer 100. Similarly, computer executable methods described herein may be performed on a computer like computer 100. Furthermore, legacy desktop applications designed to access associated data in a native format may reside on a computer like computer 100 and/or be processed by a computer like computer 100. It is to be appreciated that other computers may also be employed with the systems and methods described herein.

The processor 102 can be any of various processors including dual microprocessor and other multi-processor architectures. The memory 104 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 106 can include, but is not limited to, devices like a magnetic disk drive, a floppy disk drive, a tape drive, a Zip drive, a flash memory card, and/or a memory stick. Furthermore, the disk 106 can include optical drives like a compact disk ROM (CD-ROM), a CD recordable drive (CD-R drive), a CD rewriteable drive (CD-RW drive) and/or a digital versatile ROM drive (DVD ROM). The memory 104 can store processes 114 and/or data 116, for example. The disk 106 and/or memory 104 can store an operating system that controls and allocates resources of the computer 100.

The bus 108 can be a single internal bus interconnect architecture and/or other bus architectures. The bus 108 can be of a variety of types including, but not limited to, a memory bus or memory controller, a peripheral bus or external bus, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 100 interacts with input/output devices 118 via input/output ports 110. The input/output devices 118 can include, but are not limited to, a keyboard, a microphone, a pointing and selection device, cameras, video cards, displays, and the like. The input/output ports 110 can include but are not limited to, serial ports, parallel ports, and USB ports.

The computer 100 can operate in a network environment and thus is connected to a network 120 by a network interface 112. Through the network 120, the computer 100 may be logically connected to a remote computer 122. The remote computer 12 may serve as an enterprise server including one or more enterprise database. The network 120 includes, but is not limited to, local area networks (LAN), wide area networks (WAN), and other networks. The network interface 112 can connect to local area network technologies including, but not limited to, fiber distributed data interface (FDDI), copper distributed data interface (CDDI), ethernet/IEEE 802.3, token ring/IEEE 802.5, wireless/IEEE 802.11 and the like. Similarly, the network interface 112 can connect to wide area network technologies including, but not limited to, point to point links, and circuit switching networks like integrated services digital networks (ISDN), packet switching networks, and digital subscriber lines (DSL).

Figure 2:
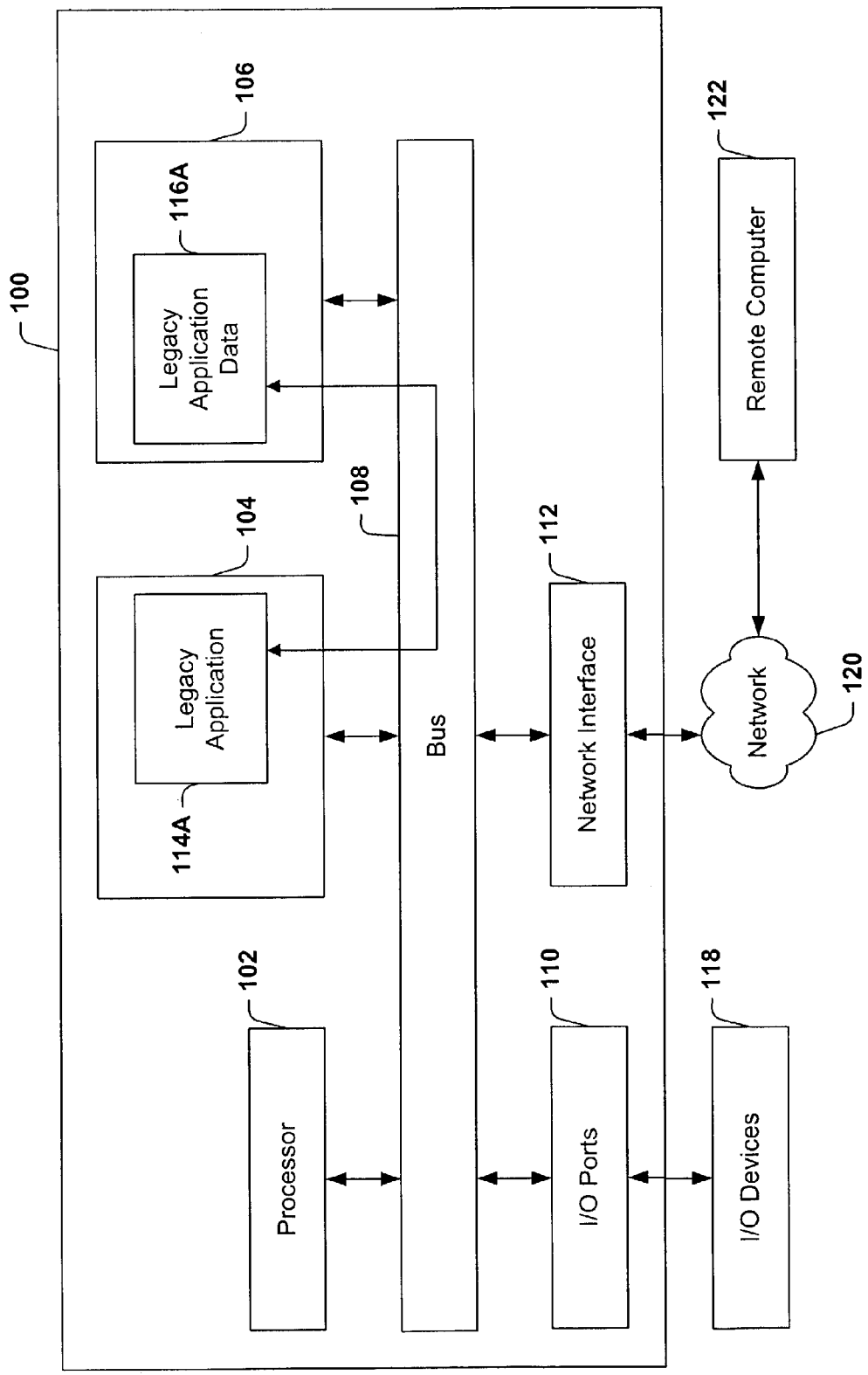
FIG. 2 is a block diagram illustrating the example personal computing environment of FIG. 1 processing an example legacy application.

FIG. 2 illustrates the computer 100 executing processing instructions for a legacy desktop application 114A. The memory 104 of the computer 100 includes, at least a portion of the legacy application processing instructions 114A. The legacy desktop application 114A is designed to utilize locally stored legacy application data in repository 116A. The legacy application data of repository 116A may be in a native format which is not supported by or compatible with other applications in the native format. The memory 104 may include other processing instructions and/or other data, and the disk 106 may store more than the repository 116A.

Figure 3:
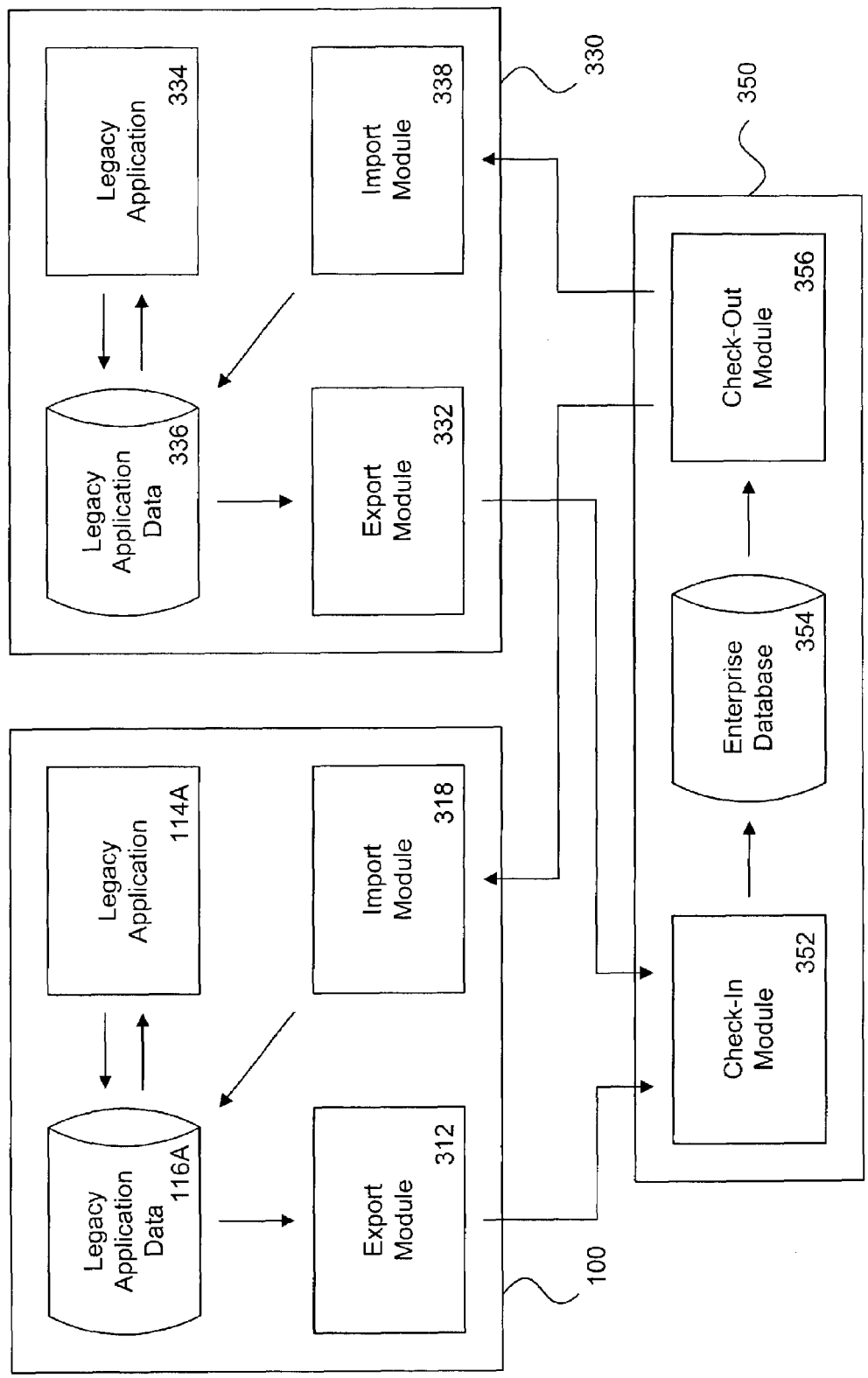
FIG. 3 is a block diagram illustrating an example enterprise architecture compatible with the methods and systems of the present application.

FIG. 3 illustrates an example enterprise environment 300 which includes computer 100, computer 330 and enterprise server 350. As illustrated in FIG. 2, computer 100 includes legacy application 114A and legacy application data repository 116A. Computer 100 further includes an export module 312 and an import module 318 for processing the application data 116A. When they are not in use, export module 312 and import module 318 may be stored locally on disk 106 or on a storage device remotely accessible by computer 100. During processing, the relevant module instructions may reside in the memory 114 of computer 100.

Like computer 100, computer 330 also includes instances of the legacy application 334, legacy application data repository 336, export module 332 and import module 338. Export module instances 312 and 332 extract at least a portion of repositories 116A and 336, respectively, in the native format, convert the data into an enterprise compatible format and transmits the data in the enterprise compatible format to a check-in module 352. Check-in module 352 receives the data in the enterprise compatible format and updates enterprise database 354 accordingly. Enterprise database 354 stores the legacy application data in a format compatible with other enterprise applications. According to one embodiment, enterprise database 354 is a relational database, but other types of databases may be employed.

Enterprise database 354 is accessible by check-out module 356. Check-out module 356 is responsible for handling requests for application data stored in the enterprise database 354. Check out module 356 extracts requested data from the enterprise database 356 and may convert it into an enterprise compatible format. The extracted and converted data is transmitted to a requesting import module instance, such as import module 338, for example. The import module instance 338 receives the extracted data in the enterprise application compatible format, converts the data into the native application format and updates the local application data repository 336 to reflect the received data.

Figure 4:
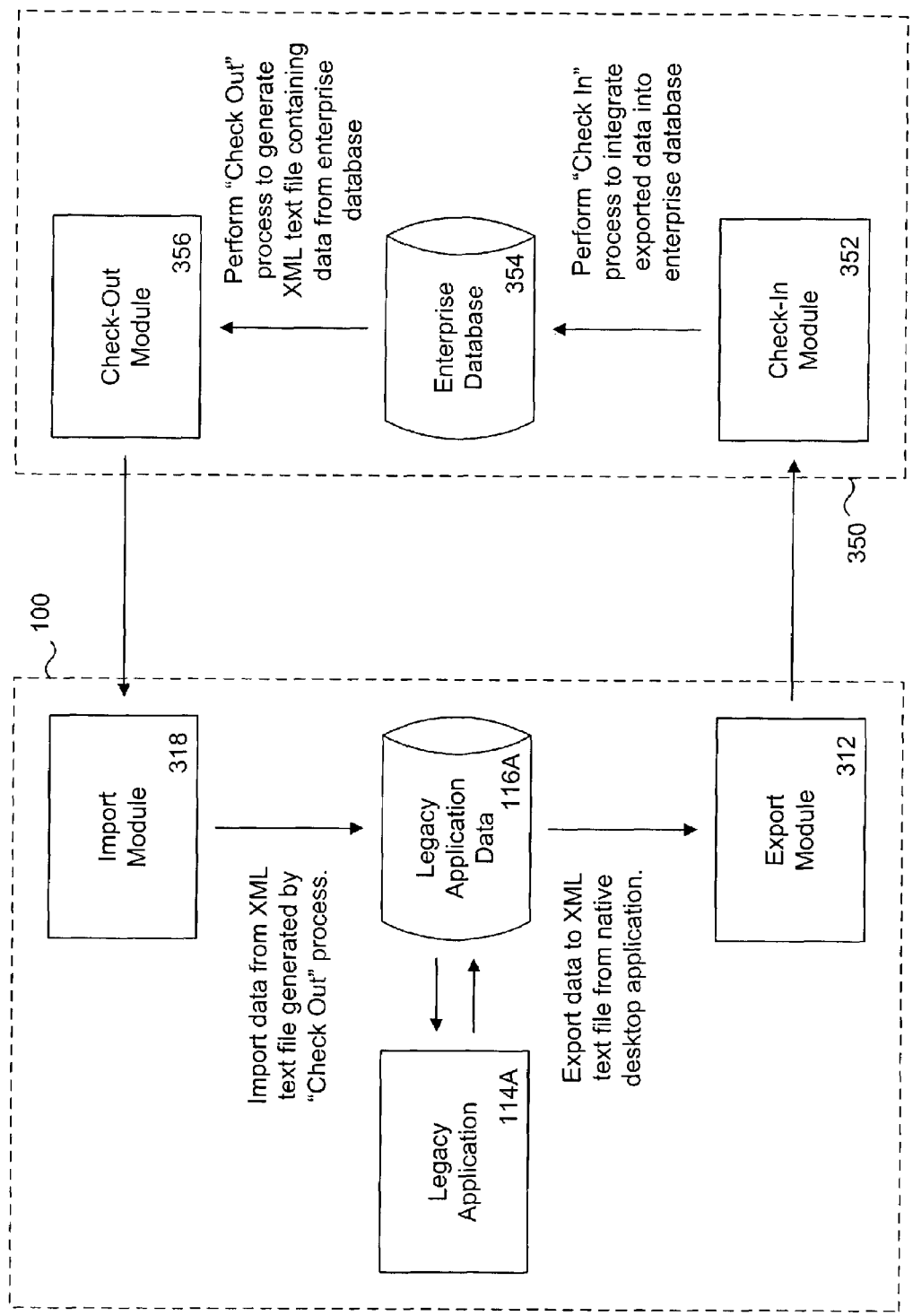
FIG. 4 is a block diagram illustrating the data flow of an example migration of data between a legacy desktop application and an enterprise database.

FIG. 4 is a block diagram illustrating the data flow of an example migration of data between legacy application repository 116A and enterprise database 354. FIG. 4 further illustrates the format of the data transferred between the modules of the example system. The system of FIG. 4 enables a legacy desktop application such as legacy application 114A to continue to operate in its native data format. Read or write access to the enterprise database 354 of enterprise database server 350 may be accomplished through a batch operation.

As shown, legacy application 114A accesses, processes and/or updates legacy application data in repository 116A in a native format on computer 100. In order to effect a migration of application data from repository 116A to enterprise database 354, export module 312 extracts data from repository 116A in the native format and converts the extracted data into a format that is compatible with other enterprise processes and applications, such as extensible mark-up language ("XML") format, for example. The extracted data in XML format is transmitted to check-in module 352 which is responsible for updating enterprise database 354 to reflect the extracted data. Check-in module 352 may convert the extracted data from the enterprise compatible format, such as XML, into a specific format of the enterprise database 354.

In order to effect a migration of data from enterprise database 354 to repository 116A, check-out module 351 extracts data from enterprise database 354 in the format of the enterprise database 354 and converts the extracted data into a format that is compatible with other enterprise processes and applications, such as XML format, for example. The extracted data in XML format is transmitted to import module 318 which is responsible for updating repository 116A to reflect the extracted data. Import module 318 converts the extracted data from the enterprise compatible format, such as XML, into the native format of the legacy application data repository 116A, and updates repository 116A accordingly.

Figure 5:
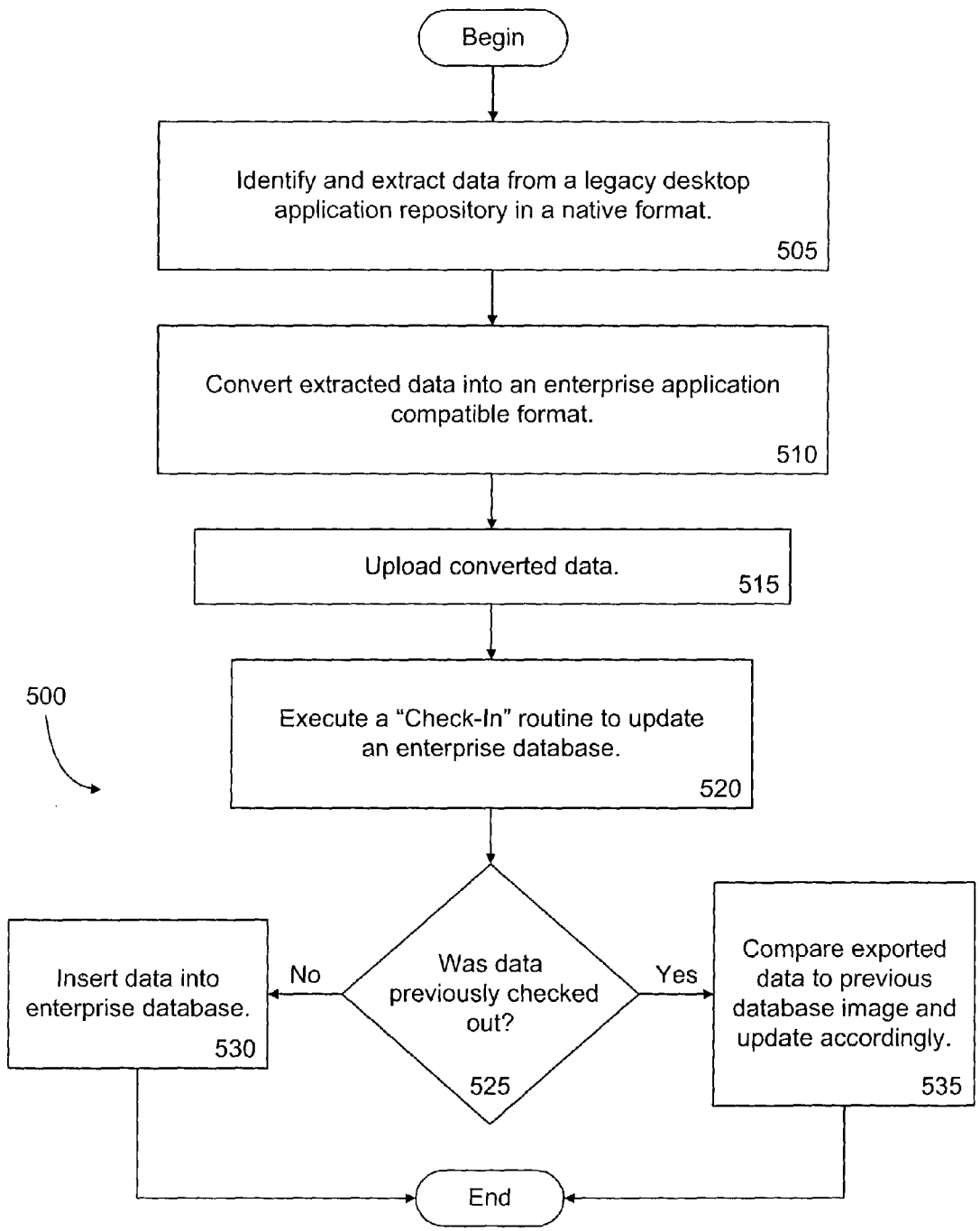
FIG. 5 is a flow chart illustrating an example methodology for migrating legacy application data from a legacy application data repository to an enterprise database.

FIG. 5 illustrates an example methodology 500 for migrating data from a legacy application data repository, such as repository 116A, to a database, such as enterprise database 354. At block 505, data is extracted from a repository such as repository 116A. The extracted data may represent all of the data stored in the repository, or it may represent a selection of a certain portion of all of the data stored in the repository. The selection and identification of the data to be extracted may be accomplished according to any method know to one of ordinary skill in the art, and may include a selection of certain records and/or certain fields.

At block 510, the extracted data is converted into a format compatible with other enterprise applications. One example of such an enterprise application compatible format is XML. The converted data may be stored in a text file. The conversion of the data effectively flattens the application's data, and enables the data to be more efficiently analyzed by data comparison functions or utilities.

At block 515, the converted data is then uploaded to a database server. A server "Check In" routine then updates the enterprise database based on the contents of the XML file (520). The Check-In routine determines whether the extracted data had been generated previously by an earlier executed "Check Out" routine (525), described in greater detail with reference to FIG. 6. The Check Out routine may be part of a server application that reads the enterprise database and converts data to the same format as the Check In process.

If the uploaded data represents something that had not been generated by an earlier executed Check-Out routine, no comparison is made, and the data is inserted into the enterprise database (530). If the extracted data had been generated by an earlier executed Check-Out routine, the Check In routine compares the extracted data with the contents of the enterprise database and updates the enterprise database accordingly (535).

Once the data is stored in the enterprise database, it is readily accessible by other instances of the legacy application. To use the data with a second instance of the legacy application, the data may be migrated from the enterprise database to a legacy application data repository used by the second instance of the legacy application.

Figure 6:
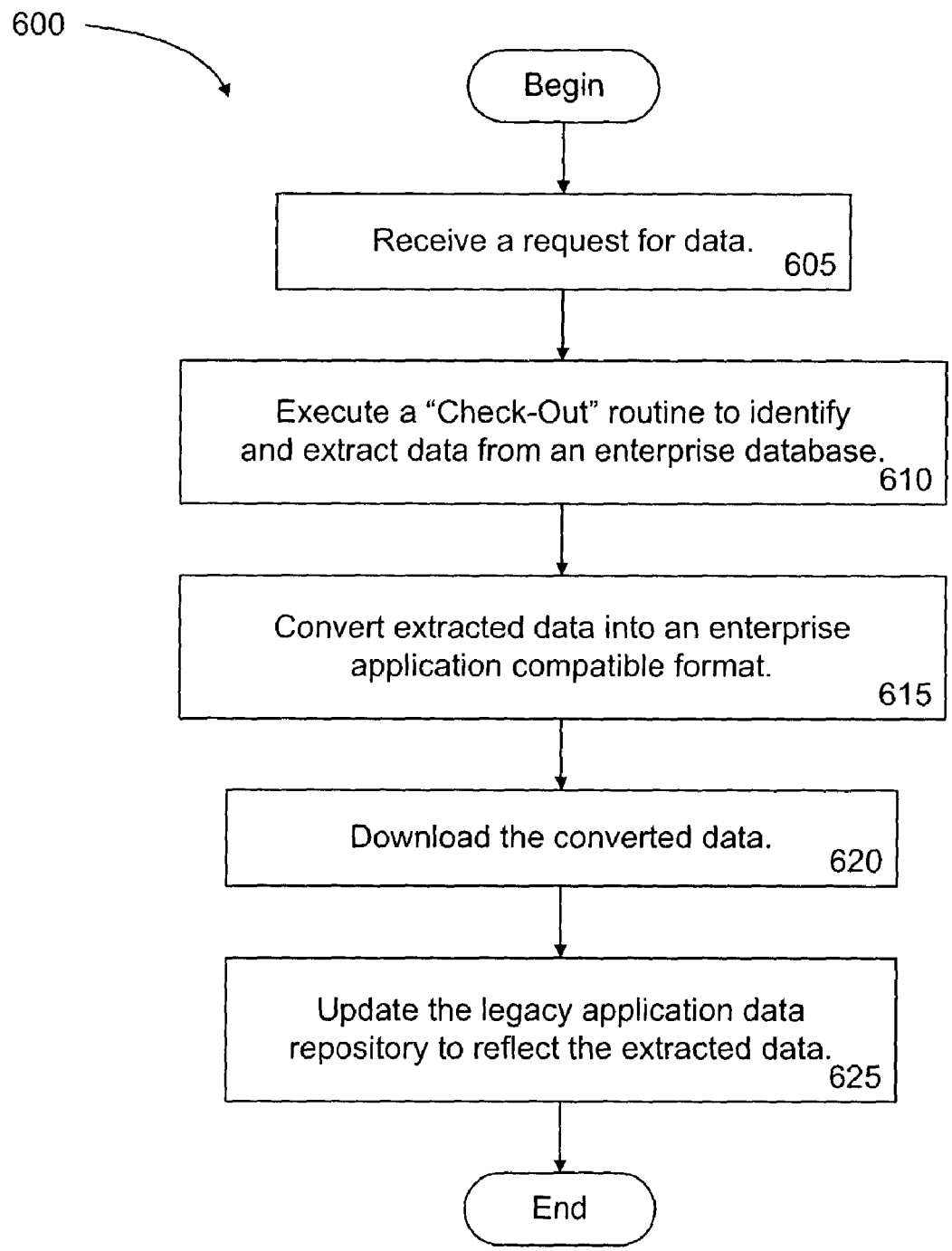
FIG. 6 is a flow chart illustrating an example methodology for migrating legacy application data from an enterprise database to a legacy application data repository.

FIG. 6 illustrates an example methodology 600 for migrating data from a database, such as enterprise database 354, to a repository, such as repository 116A. At block 605, a request is received to extract data from the enterprise database. The request may include selection criteria identify certain data, records and/or fields to be extracted from the database. At block 610, the requested data is identified and extracted from the database.

At block 615, the extracted data is converted into a format compatible with other enterprise applications such as XML, for example. As in methodology 500, the converted data may be stored in a text file, effectively flattening the application's data.

At block 620, the converted data is then downloaded onto a computer, such as computer 100. An import routine is executed at block 625 that updates the legacy application data repository based on the contents of the XML file. According to one embodiment, the import routine generates a legacy application data repository containing only the data extracted from the enterprise database.

In an alternate embodiment, the import routine may determine whether the data to be imported had been generated previously exported by an earlier executed export routine. If the imported data had not been generated by an earlier executed export routine, the extracted data may be inserted into the enterprise database, otherwise the import routine compares the data to be imported with the contents of the legacy application data repository and updates the repository accordingly.

There are numerous benefits associated with the described methods and systems. Specifically, the described methods and systems require minimal change for the legacy application. If any change is require, an import/export functionality between a native format and an enterprise application compatible format is the change implemented. In addition, the described methods and systems support backward compatibilities of the legacy application. Few, if any, changes are required of the native format of the desktop application, which makes it possible for any existing application data to be used in the future.

In addition, the asynchronous nature of the described methods enable the legacy application to be used offline. It may also improve performance because the Check In and Check Out routines may be batch operations running on a server computer.

What has been described above includes several examples. It is, of course, not possible to describe every conceivable combination of components or methodologies for purposes of describing the systems, methods, and computer readable media associated with managing legacy application data. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A method for migrating data between a legacy application data repository and an enterprise database, comprising:
    extracting a first set of data in a native format from a legacy application data repository that is stored in a first computer and that is accessible by a legacy desktop application;
    processing the first set of data to generate, at the first computer, a second set of data in an enterprise application compatible format;
    transmitting the second set of data from the first computer to a database server associated with an enterprise database;
    updating the enterprise database based at least in part on the second set of data;
    extracting a third set of data from the enterprise database, wherein the third set of data is extracted in the enterprise application compatible format;
    transmitting the third set of data from the enterprise server to the first computer;
    processing the third set of data to generate, at the first computer, a fourth set of data in the native format; and
    updating the legacy application data repository based at least in part on the fourth set of data in the native format.

2. The method of claim 1, wherein the enterprise application compatible format is an extensible markup language format.

3. The method of claim 1, wherein extracting comprises identifying at least a portion of data of the legacy application data repository to be extracted.

4. The method of claim 3, wherein the first set of data is the identified portion of the data of the legacy application data repository.

5. The method of claim 1, wherein updating comprises:
    determining that the second set of data represents data which was previously checked out from the enterprise database;
    comparing the second set of data to data in the enterprise database; and
    replacing a portion of the data in the enterprise database with the second set of data.

6. The method of claim 1, wherein the enterprise database is a relational database.

7. A method for migrating data from an enterprise database to a legacy application data repository, comprising:
    receiving a request for data stored in an enterprise database, the request received from a remote computer associated with a legacy application data repository;
    extracting a first set of data from the enterprise database, wherein the first set of data is extracted in an enterprise application compatible format;
    transmitting the first set of data to the remote computer;
    processing the first set of data to generate, at the remote computer, a second set of data in a native format compatible with the legacy application data repository; and
    updating the legacy application data repository based at least in part on the second set of data, the legacy application data repository stored in memory of the remote computer and accessible by a legacy desktop application.

8. The method of claim 7, wherein the first set of data is in an extensible markup language format.

9. The method of claim 7, wherein updating the legacy application data repository comprises adding a record based on the second set of data.

10. The method of claim 7, wherein updating the legacy application data repository comprises:
    comparing the second set of data to data in the legacy application data repository; and
    replacing a portion of the legacy application data repository with the second set of data.

11. The method of claim 7, wherein the enterprise database is a relational database.

12. A system for migrating data between a legacy application data repository and an enterprise database, comprising:
    a first computer operable to:
        store a first legacy application data repository;
        extract, from the first legacy application data repository, a first set of data in a native format; and
        convert the first set of data to a second set of data in an enterprise application compatible format;
    an enterprise server communicatively coupled to the first computer, wherein the enterprise server is operable to:
        receive, from the first computer, the second set of data;
        update, based at least in part on the second set of data, an enterprise database that is associated with the enterprise server; and
        extract, from the enterprise database, a third set of data in the enterprise application compatible format;
    and
    a second computer communicatively coupled to the enterprise server, wherein the second computer is operable to:
        store a second legacy application data repository;
        receive, from the enterprise server, the third set of data;
        convert the third set of data to a fourth set of data in the native format; and update the second legacy application data repository based at least in part on the fourth set of data.

13. The system of claim 12, wherein the enterprise application compatible format is an extensible markup language format.

14. The system of claim 12, wherein converting the first set of data to a second set of data in an enterprise application compatible format comprises converting the first set of data to a second set of data that is in an extensible markup language format and that is stored in a text file.

15. The system of claim 12, wherein the enterprise server is further operative to:
   determine that the second set of data was previously checked out from the enterprise database;
   compare the second set of data to data in the enterprise database; and
   replace a portion of the data in the enterprise database with the second set of data.

16. The system of claim 12, wherein the third set of data is extracted from the enterprise database in response to a request, received from the second computer, that identifies one or more records to be extracted.

17. The system of claim 12, wherein the second computer is further operative to:
   compare the fourth set of data to data in the second legacy application data repository; and
   replace a portion of the second legacy application data repository with the fourth set of data.

18. The system of claim 12, wherein:
   the first computer is further operable to execute a first legacy desktop application associated with the first legacy application data repository; and
   the second computer is further operable to execute a second legacy desktop application associated with the second legacy application data repository.

19. A method for migrating data between a legacy application data repository and an enterprise database, comprising:
   extracting a first set of data from a first legacy application data repository that is stored in a first computer, wherein the first set of data is extracted in a native format compatible with the first legacy application data repository;
   converting the first set of data into an enterprise application compatible formats wherein the first set of data is converted by the first computer;
   updating an enterprise database to comprise the converted first set of data, wherein the enterprise database is associated with an enterprise server;
   extracting a second set of data from the enterprise database, wherein the second set of data is extracted in the enterprise application compatible format;
   converting the second set of data into a native format compatible with a second legacy application data repository that is stored in a second computer, wherein the second set of data is converted by the second computer; and
   updating the second legacy application data repository to comprise the converted second set of data.

20. The method of claim 19, wherein converting the first set of data into an enterprise application compatible format comprises converting the first set of data into a text file comprising data in an extensible markup language format.

21. The method of claim 19, wherein the second set of data is extracted from the enterprise database in response to a request, received from the second computer, that identifies one or more records to be extracted.

22. The method of claim 19, wherein:
   the first legacy application data repository is associated with a first legacy desktop application; and
   the second legacy application data repository is associated with a second legacy desktop application.

* * * * *